(12) United States Patent
Ghai et al.

(10) Patent No.: US 11,797,287 B1
(45) Date of Patent: Oct. 24, 2023

(54) AUTOMATICALLY TERMINATING DEPLOYMENT OF CONTAINERIZED APPLICATIONS

(71) Applicant: Amazon Technologies, Inc., Seattle, WA (US)

(72) Inventors: Mohan Ghai, Jersey City, NJ (US); Soheil Norouzi, Brooklyn, NY (US); Shuchen F Ye, New York, NY (US); David Michael Westbrook, Seattle, WA (US); Pavneet S Ahluwalia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/204,626

(22) Filed: Mar. 17, 2021

(51) Int. Cl.
| | |
|---|---|
| *G06F 8/61* | (2018.01) |
| *H04L 67/00* | (2022.01) |
| *G06F 11/07* | (2006.01) |
| *G06F 11/36* | (2006.01) |
| *G06F 9/455* | (2018.01) |

(52) U.S. Cl.
CPC ............ *G06F 8/62* (2013.01); *G06F 9/45541* (2013.01); *G06F 9/45558* (2013.01); *G06F 11/0754* (2013.01); *G06F 11/3644* (2013.01); *H04L 67/34* (2013.01); *G06F 2009/45575* (2013.01); *G06F 2009/45591* (2013.01)

(58) Field of Classification Search
CPC .... G06F 8/62; G06F 9/45541; G06F 9/45558; G06F 11/3644; G06F 11/0754; G06F 2009/45575; G06F 2009/45591; H04L 67/34
See application file for complete search history.

(56) References Cited

U.S. PATENT DOCUMENTS

| | | | |
|---|---|---|---|
| 7,844,480 B2 | 11/2010 | Ricketts | |
| 8,898,402 B1 | 11/2014 | Strange | |
| 9,110,496 B1 * | 8/2015 | Michelsen | .......... G06F 11/3664 |
| 9,152,441 B2 | 10/2015 | Anderson | |

(Continued)

OTHER PUBLICATIONS

U.S. Appl. No. 16/217,454, filed Dec. 12, 2018, Aithal et al.

(Continued)

*Primary Examiner* — Wei Y Zhen
*Assistant Examiner* — Brahim Bourzik
(74) *Attorney, Agent, or Firm* — Knobbe, Martens, Olson & Bear, LLP (57) ABSTRACT

Generally described, the present application relates to providing a container orchestration service ("service") that can automatically detect and terminate a failed deployment and automatically roll back to a previous healthy deployment. For example, the service may receive a request to deploy a new user code onto one or more compute instances usable to execute the new user code, where the new user code is an updated version of an old user code to be replaced by the new user code. The service may then attempt to execute a plurality of instances of the new user code on the one or more compute instances, determine, prior to replacing all instances of the old user code to be replaced by the plurality of instances of the new user code, that the deployment of the new user code has satisfied a failed deployment condition, and terminate the deployment of the new user code.

20 Claims, 6 Drawing Sheets

(56) References Cited

U.S. PATENT DOCUMENTS

| | | | |
|---|---|---|---|
| 9,164,802 B2 | 10/2015 | Netto | |
| 9,256,467 B1 | 2/2016 | Singh et al. | |
| 9,549,038 B1 | 1/2017 | Anne | |
| 9,667,498 B2 | 5/2017 | Wu et al. | |
| 9,848,041 B2 | 12/2017 | Einkauf et al. | |
| 9,898,347 B1 | 2/2018 | Gupta | |
| 9,910,713 B2 | 3/2018 | Wisniewski et al. | |
| 9,928,108 B1 | 3/2018 | Wagner et al. | |
| 10,067,801 B1 | 9/2018 | Wagner | |
| 10,135,712 B2 | 11/2018 | Wu et al. | |
| 10,310,966 B1* | 6/2019 | Ge | G06F 9/45558 |
| 10,432,551 B1 | 10/2019 | Vosshall et al. | |
| 10,581,964 B2 | 3/2020 | Einkauf et al. | |
| 10,606,660 B1 | 3/2020 | Hartley et al. | |
| 10,771,337 B1 | 9/2020 | Das et al. | |
| 10,824,474 B1 | 11/2020 | Kamboj et al. | |
| 10,871,995 B2 | 12/2020 | Gerdesmeier et al. | |
| 11,385,938 B2 | 7/2022 | Kim | |
| 11,392,422 B1 | 7/2022 | Filiz et al. | |
| 11,403,150 B1 | 8/2022 | Featonby et al. | |
| 11,422,844 B1 | 8/2022 | Filiz et al. | |
| 11,487,591 B1 | 11/2022 | Featonby | |
| 11,573,816 B1 | 2/2023 | Featonby et al. | |
| 2005/0002375 A1 | 1/2005 | Gokhale et al. | |
| 2008/0282267 A1* | 11/2008 | Adam | G06F 9/5066 719/320 |
| 2011/0246515 A1* | 10/2011 | Johnson | G06F 8/60 707/769 |
| 2012/0210326 A1 | 8/2012 | Torr et al. | |
| 2012/0233668 A1 | 9/2012 | Leafe et al. | |
| 2013/0124807 A1 | 5/2013 | Nielsen et al. | |
| 2013/0160008 A1 | 6/2013 | Cawlfield et al. | |
| 2014/0079207 A1* | 3/2014 | Zhakov | G06F 9/45558 379/265.03 |
| 2014/0358710 A1 | 12/2014 | Balestrieri et al. | |
| 2015/0106805 A1 | 4/2015 | Melander et al. | |
| 2015/0142878 A1 | 5/2015 | Hebert et al. | |
| 2016/0077846 A1 | 3/2016 | Phillips et al. | |
| 2016/0323377 A1 | 11/2016 | Einkauf et al. | |
| 2016/0378559 A1 | 12/2016 | Bhandarkar et al. | |
| 2017/0063659 A1* | 3/2017 | Platon | H04L 41/0604 |
| 2017/0078433 A1 | 3/2017 | Radhakrishnan et al. | |
| 2017/0090961 A1 | 3/2017 | Wagner et al. | |
| 2017/0115978 A1* | 4/2017 | Modi | G06F 8/65 |
| 2017/0177413 A1 | 6/2017 | Wisniewski et al. | |
| 2017/0177860 A1 | 6/2017 | Suarez et al. | |
| 2017/0177877 A1 | 6/2017 | Suarez et al. | |
| 2017/0180346 A1 | 6/2017 | Suarez et al. | |
| 2017/0339158 A1 | 11/2017 | Lewis et al. | |
| 2017/0339196 A1 | 11/2017 | Lewis et al. | |
| 2018/0004503 A1* | 1/2018 | OlmstedThompson | H04L 67/34 |
| 2018/0088993 A1 | 3/2018 | Gerdesmeier et al. | |
| 2018/0101403 A1 | 4/2018 | Baldini Soares et al. | |
| 2018/0129539 A1 | 5/2018 | Sadat | |
| 2018/0150325 A1 | 5/2018 | Kuo et al. | |
| 2018/0246745 A1 | 8/2018 | Aronovich et al. | |
| 2018/0285204 A1* | 10/2018 | Dwarampudi | G06F 11/3034 |
| 2018/0331971 A1 | 11/2018 | Certain et al. | |
| 2019/0050680 A1 | 2/2019 | Waugh et al. | |
| 2019/0102231 A1 | 4/2019 | Wagner | |
| 2019/0108049 A1 | 4/2019 | Singh et al. | |
| 2019/0146774 A1* | 5/2019 | Moore | G06F 8/65 717/172 |
| 2019/0188107 A1* | 6/2019 | Alston | G06F 11/3495 |
| 2019/0243681 A1 | 8/2019 | Chen | |
| 2019/0294477 A1 | 9/2019 | Koppes et al. | |
| 2019/0324786 A1 | 10/2019 | Ranjan et al. | |
| 2019/0340033 A1 | 11/2019 | Ganteaume | |
| 2019/0347127 A1 | 11/2019 | Coady et al. | |
| 2019/0392045 A1 | 12/2019 | De Lima Junior et al. | |
| 2020/0073649 A1 | 3/2020 | Viana et al. | |
| 2020/0142711 A1 | 5/2020 | Varda et al. | |
| 2020/0174842 A1 | 6/2020 | Wang et al. | |
| 2020/0213279 A1 | 7/2020 | Xiong et al. | |
| 2020/0241930 A1 | 7/2020 | Garg et al. | |
| 2020/0249977 A1 | 8/2020 | Mentz et al. | |
| 2020/0310845 A1 | 10/2020 | Liguori et al. | |
| 2020/0310850 A1 | 10/2020 | Liguori et al. | |
| 2020/0356387 A1 | 11/2020 | Anwar et al. | |
| 2020/0358719 A1 | 11/2020 | Mestery et al. | |
| 2020/0412596 A1 | 12/2020 | Cherunni | |
| 2021/0064442 A1 | 3/2021 | Alluboyina et al. | |
| 2021/0089361 A1 | 3/2021 | Rafey et al. | |
| 2021/0109775 A1 | 4/2021 | Shen et al. | |
| 2021/0117217 A1 | 4/2021 | Croteau et al. | |
| 2021/0141655 A1 | 5/2021 | Gamage et al. | |
| 2021/0158083 A1 | 5/2021 | Gan et al. | |
| 2021/0160162 A1 | 5/2021 | Abbas | |
| 2021/0184942 A1 | 6/2021 | Tootaghaj et al. | |
| 2021/0232344 A1 | 7/2021 | Corrie | |

OTHER PUBLICATIONS

U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.
Chavan, et al., "Clustered Virtual Machines for Higher Availability of Resources with Improved Scalability in Cloud Computing," 2014 IEEE, pp. 221-225.
Chen, et al., "Virtual Cluster: Customizing the Cluster Environment through Virtual Machines," 2008 IEEE, pp. 411-416.
Dettori, "Blueprint for Business Middleware as a Managed Cloud Service", IEEE International Conference on Cloud Engineering, 2014, pp. 261-270.
Sharifi, et al., "VCE: A New Personated Virtual Cluster Engine for Cluster Computing," 2008 IEEE, 6 pages.

* cited by examiner

AUTOMATICALLY TERMINATING DEPLOYMENT OF CONTAINERIZED APPLICATIONS

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

DETAILED DESCRIPTION

Introduction

The present disclosure generally relates to providing improved techniques for providing an orchestration service that can automatically detect and terminate a failed deployment ("circuit breaker") and automatically roll back to a previous healthy deployment. Many software applications can run using one or more computing "clusters," which can include at least one cluster master (which runs control processes including scheduling, resource control, handling API requests, and deciding what runs on the cluster's nodes) and multiple nodes (which are the worker machines that run containerized applications and other workloads). These clusters can be hosted on or across a set of physical machines, which may include a single physical machine or multiple physical machines, in a distributed computing environment such as a cloud provider network.

A developer can package a software application and everything else needed to run the application in a container image (e.g., a standalone, executable package of software that includes everything needed to run an application process) and send a request to the cloud provider network to execute the application in a cluster. In the request, the developer may indicate any information needed to execute the application in the cluster. In response, the cloud provider network may utilize the compute capacity in the cluster to execute the application.

In some cases, the developer may make changes to the software application and wish to cause an updated version of the software application to be executed in the cluster, instead of the older version. In such cases, the developer may send a deployment request to the cloud provider network, indicating the version of the software application to be deployed in the cluster. However, in prior implementations, in the event that the new version contains an error that prevents the software application to be successfully execute, the cloud provider network may try to execute the software application indefinitely, wasting valuable computing resources.

The aforementioned challenges, among others, is addressed in some embodiments by the disclosed techniques for providing an orchestration service that can automatically detect and terminate a failed deployment and automatically roll back to a previous healthy deployment. By establishing and checking for conditions that may indicate that a given deployment has failed, the cloud provider network can detect a failed deployment before user intervention or triggering of lengthy timeouts, thereby reducing the amount of computing resources expended on failed deployments. Additionally, upon detecting a failed deployment, the system may roll back to a previously healthy deployment, thereby improving user experience and availability of the user's code.

The presently disclosed embodiments therefore address technical problems inherent within computing systems. These technical problems are addressed by the various technical solutions described herein, including providing a mechanism for automatically detecting and terminating a failed deployment of software applications. Thus, the present disclosure represents an improvement on existing software execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Container Service

Figure 1:
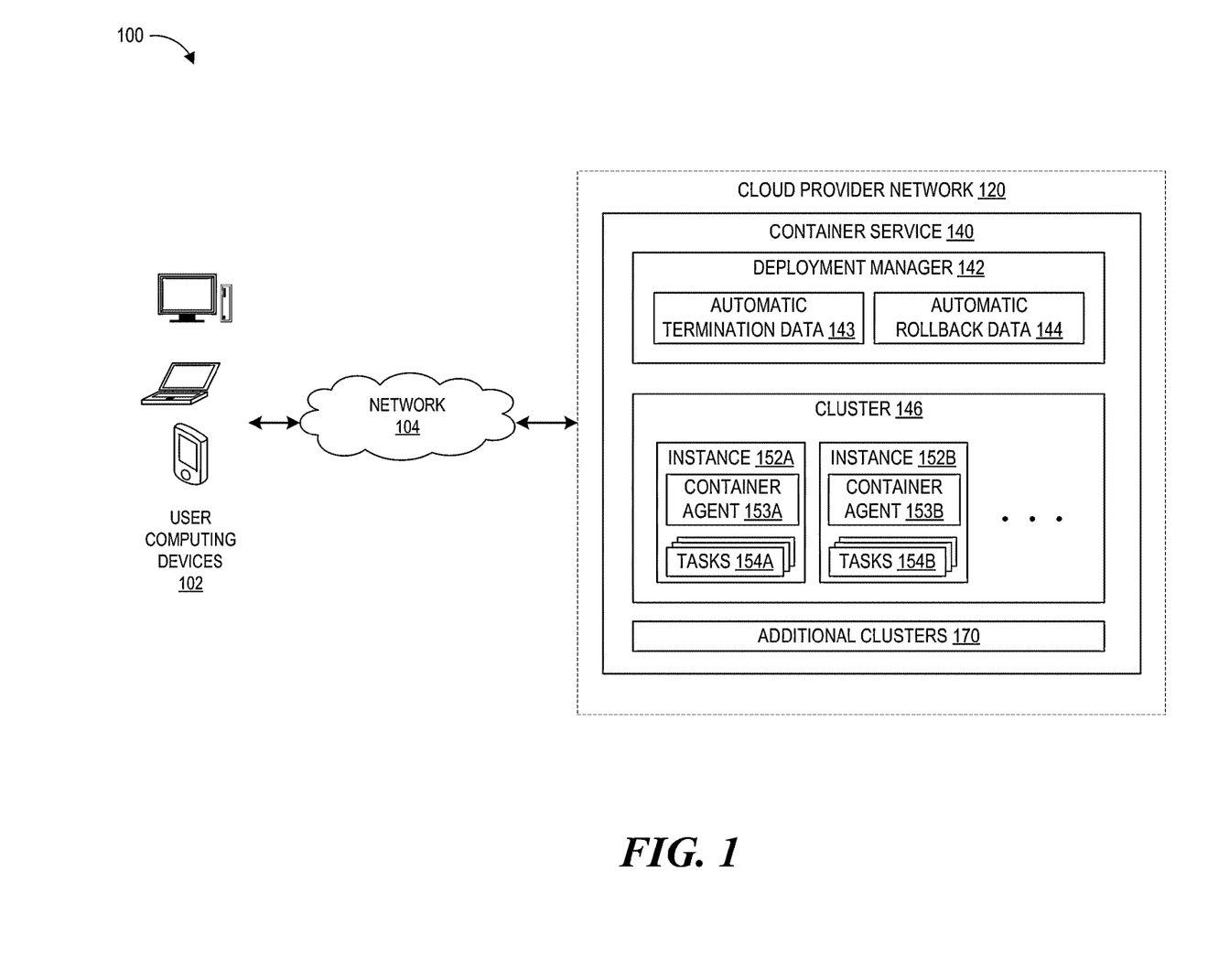
FIG. 1 depicts a schematic diagram of a network environment in which a cloud provider network is used to implement a container service and a deployment manager in accordance with aspects of the present disclosure.

FIG. 1 depicts an example computing environment 100 including a cloud provider network 120 in which the disclosed container service and deployment manager can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for managing task executions across internal and external compute capacity may be implemented in non-elastic computing environments as well.

The cloud provider network 120 can be accessed by user computing devices 102 over a network 104. The cloud provider network 120 may include a container service 140 (referred to in various implementations as a container service, cloud container service, container engine, or container cloud service) and one or more other services not illustrated in FIG. 1 (as further described herein) that are in networked communication with one another and with the network 104 to provide users with access to the services and resources provided by the cloud provider network 120.

In the example of FIG. 1, the container service 140 provides a deployment manager 142, a cluster 146, and additional clusters 170. The deployment manager 142 manages the deployment of user code in the form of tasks executed in the clusters 146 and 170, which may include receiving a request to deploy a new user code, monitoring the deployment of the new user code, and automatically detecting and/or terminating the deployment of the user code.

The deployment manager 142 may automatically detect and terminate a deployment based on automatic termination data 143 and automatically perform a rollback to a previous healthy deployment using automatic rollback data 144. The automatic termination data 143 may indicate one or more conditions and/or thresholds for determining whether a deployment has failed and/or whether a task launch performed as part of the deployment has failed. The automatic rollback data 144 may indicate one or more deployments performed prior to the current (attempted) deployment. In some embodiments, performing a rollback is identical to performing a new deployment based on an older version of the code that was previously successfully deployed on the cloud provider network 120, as further described herein.

As shown in FIG. 1, the instances 152A and 152B have container agents 153A and 153B configured to perform operations on behalf of the instances 152A and 152B, respectively. The instances 152A and 152B also have tasks 154A and 154B executing thereon, respectively. Although FIG. 1 shows clusters 146 and 170, in other embodiments, any number of clusters (e.g., 0, 1, 2, 5, or 100) may be part of the container service 140 and/or managed by the deployment manager 142.

The container service 140 may provide the compute capacity used in the cluster 146 (e.g., instances 152) using the services provided by a compute service (not illustrated in FIG. 1) of the cloud provider network 120. Such a compute service may include one or more servers which provide resizable computing capacity to users for building and hosting their software systems. The compute service and associated control plane functionality can provide an elastic compute cloud service of the cloud provider network 120. Compute resources can be provided from the compute service to customers via an elastic compute cloud service (referred to in various implementations as an elastic compute service, a virtual machines service, a computing cloud service, a compute engine, or a cloud compute service). Users can use the compute service to launch as many virtual computing environments, referred to as virtual compute instances, virtual machine instances, virtual machines, or collectively as "instances," as they need. Instances can have various configurations of processing power, memory, storage, and networking capacity depending upon user needs. The compute service can also include computer storage for temporary data used while an instance is running; however, as soon as the instance is shut down this data is lost.

The cloud provider network 120 may provide the instances (also referred to as virtual compute instances, compute instances, virtual machine instances, or virtual machines) shown in FIG. 1 with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Although the instances 152 are used as examples in FIG. 1, the compute resources usable by the clusters 146 and 170 include one or more of physical machines, virtual machines, containers, nodes, or other forms of virtual or physical compute units that are configured to execute one or more applications.

In some implementations, at least a subset of virtualization management tasks may be performed at one or more offloading cards so as to enable more of the processing capacity of the host to be dedicated to client-requested compute instances, e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The container service 140 may provide a set of application programming interfaces ("APIs") that can be used by the users of the user computing devices 102 to add, modify, or remove compute capacity to the clusters; and/or request execution of user applications (e.g., tasks) on the clusters. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Further details regarding the container service 140 can be found within U.S. Pat. No. 9,256,467, entitled "SYSTEM FOR MANAGING AND SCHEDULING CONTAINERS" and filed Nov. 11, 2014, the entirety of which is hereby incorporated by reference.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of some software container services, a task refers to a container, or multiple containers working together, running to execute the functionality of a software application or a particular component of that application. A cluster refers to a logical grouping of tasks. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of the cloud provider network 120 can deploy containers by managing clusters of compute instances that run container agents. As described herein, such compute instances can be implemented within the cloud provider network 120. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Some implementations of the cloud provider network 120 can additionally include object storage servers, block store servers, domain name services ("DNS") servers, relational database servers, file system servers, message queuing servers, logging servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable "virtual computing devices" via their use of the clusters 146 and 170 and/or the instances 152 illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services), file system services, message queuing services, logging services, and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for managing task executions using internal and external compute capacity can be implemented as part of a virtual compute service, container service, or Kubernetes-based container service in some embodiments.

Example Routine for Automatically Detecting and Terminating a Failed Deployment

Figure 2:
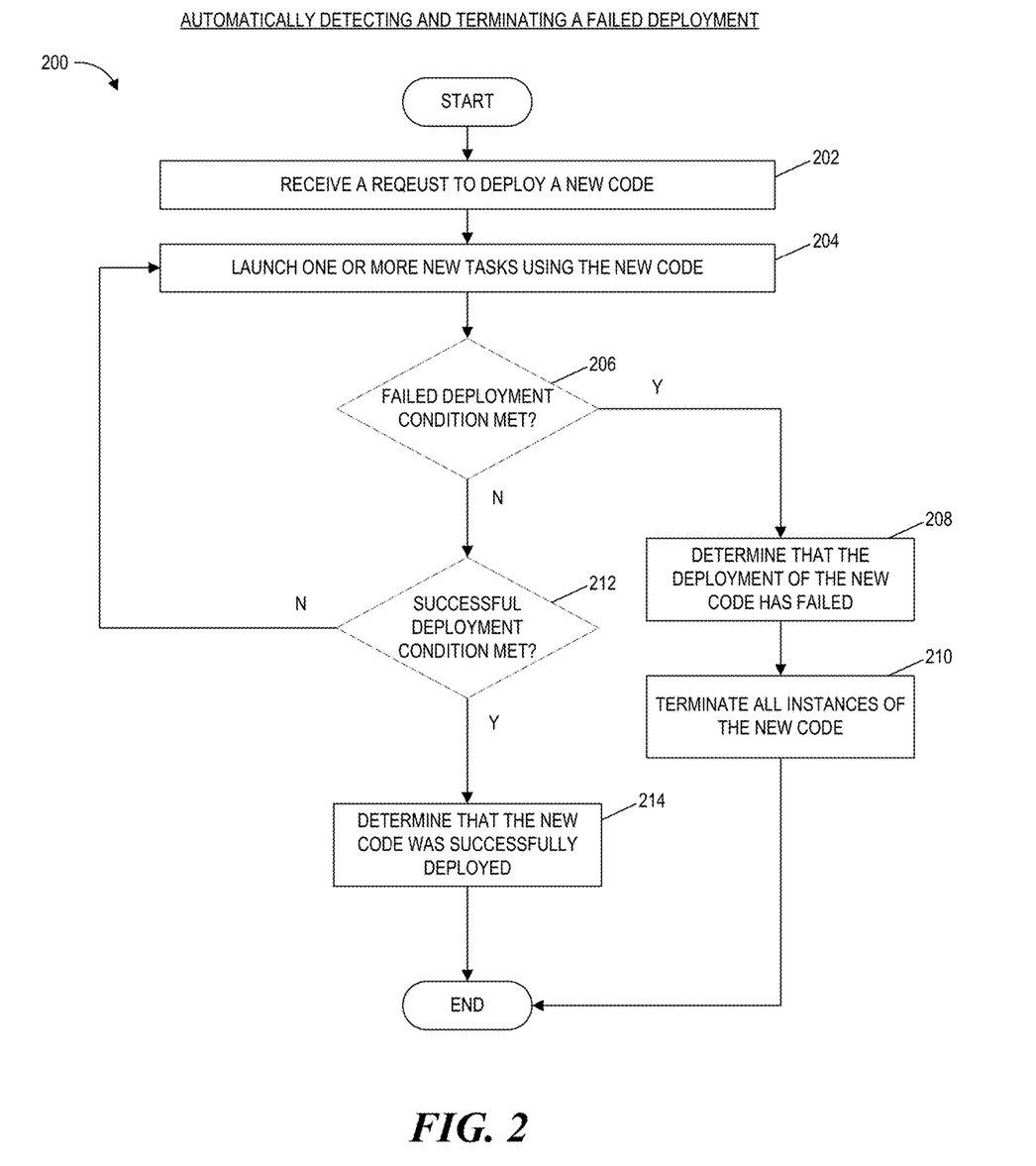
FIG. 2 is a flowchart of an example process for automatically detecting and terminating a failed deployment, in accordance with aspects of the present disclosure.

FIG. 2 depicts an illustrative routine 200 for automatically detecting and terminating a failed deployment in accordance with aspects of the present disclosure. The routine 200 may be carried out, for example, by the container service 140 (or a component thereof such as the deployment manager 142) or one or more other components of the cloud provider network 120 described herein. For convenience, some or all of the steps of the routine 200 are described as being performed by the deployment manager 142. For example, the deployment manager 142 may include one or more hardware computing devices and non-transitory physical computer storage storing instructions that, when executed by the one or more hardware computing devices, cause the one or more hardware computing devices to perform the steps of the routine 200.

The routine 200 begins at block 202, at which the deployment manager 142 receives a request to deploy a new user code. The request may identify the cluster in which the new user code is to be deployed in the form of tasks. Additionally, the request may include a task definition indicating the one or more container images needed to execute the task and one or more computing resource requirements associated with the task. In some embodiments, the request specifies the number of instances (or copies) of the new user code to be executed in parallel as part of deploying the new user code. In some embodiments, the requested deployment is a rolling deployment in which portions of the existing deployment executing old code are torn down and/or replaced with the new code as the new deployment is being set up, and the process is repeated until the entire deployment is replaced with the new deployment. In other embodiments, the requested deployment leaves the existing deployment intact (e.g., without terminating or pausing any tasks using the old code) as the new deployment is being set up (e.g., blue/green or canary type).

A rolling deployment may be associated with a minimum healthy percentage and a maximum percentage. The minimum healthy percentage may represent a lower limit on the number of the tasks that must remain in the running state during a deployment, as a percentage of the desired number of tasks (e.g., rounded up to the nearest integer). This parameter enables a user to deploy without using additional cluster capacity. For example, if the user's service has a desired number of four tasks and a minimum healthy percent of 50%, the deployment manager 142 may stop two existing tasks (e.g., using the old user code) to free up cluster capacity before starting two new tasks (e.g., using the new user code). The default value for minimum healthy percentage may be 50% (or 100%) and can be updated by the user as needed. The maximum percentage may represent an upper limit on the number of tasks that are allowed in the running (or pending) state during a deployment, as a percentage of the desired number of tasks (e.g., rounded down to the nearest integer). This parameter enables the user to define the deployment batch size. For example, if the user's service has a desired number of four tasks and a maximum percent value of 200%, the scheduler may start four new tasks (e.g., using the new user code) before stopping the four older tasks (e.g., using the old user code), provided that the cluster resources required to do this are available. The default value for maximum percent may be 200% and can be updated by the user as needed.

At block 204, the deployment manager 142, based on the request, launches one or more new tasks using the new user code. For example, the deployment manager 142 may continue to launch additional tasks until the deployment is declared as failed at block 206 or declared as successful at block 212. The number of new tasks to be launched at block 204 may be determined based on the batch size described in the above paragraph.

At block 206, if the deployment manager 142 determines whether a failed deployment condition has been met. If the deployment manager 142 determines that the failed deployment condition has been met, the routine 200 proceeds to block 208, at which the deployment manager 142 determines that the deployment of the new user code has failed and terminate, at block 210, all instances of the new user code that were successfully launched, if any. In some embodiments, the failed deployment condition is satisfied if a threshold number of consecutive attempts to launch a new task based on the new user code fail. How the deployment manager 142 may determine that a new task has failed is described in greater detail below with reference to FIG. 3. In other embodiments, the failed deployment condition is satisfied if a threshold number of failed attempts to launch a new task based on the new user code (which may be a specific number or multiples of the total number of tasks needed to be launched as part of the new deployment) is reached with a threshold percentage of the new tasks failing. For example, the deployment manager 142 may determine that a deployment has failed if the total number of failed attempts has reached 50 attempts with a 90% failure rate. As another example, the deployment manager 142 may determine that a deployment that requires 20 tasks to be executed in parallel has failed if the number of failed attempts reaches 40 (e.g., twice the number of tasks to be executed in parallel as part of the new deployment) at at least 85% task launch failure rate.

In some embodiments, the deployment manager 142 determines whether the failed deployment condition is met at block 206 based at least in part on internal information that is not communicate to the user and/or not available to the user. For example, when a task fails to launch due to the user not having a sufficient amount of compute capacity, the user may be notified that the task failed to launch due to insufficient capacity ("first type of information"). The deployment manager 142, in addition to this information, keep track of how many retries of the task launch was performed, how much time each retry took before the task launch failed, and the like ("second type of information). In such cases, the deployment manager 142 may not only rely on the first type of information, but also on the second type of information to make the determination at block 206. In some embodiments, the deployment manager 142 makes the determination of block 206 based solely on the first type of information (e.g., has the number of consecutive task launch failures or errors reached a threshold value?). In other embodiments, the deployment manager 142 makes the determination of block 206 based solely on the second type of information (e.g., has the number of consecutive failed task launch retries reached a threshold value?). In yet other embodiments, the deployment manager 142 makes the determination of block 206 based on a combination of the first type of information and the second type of information (e.g., has the sum of the number of consecutive failed task launch retries and the number of task launch errors reached a threshold value?).

If the deployment manager 142 determines that the failed deployment condition has not been met, the routine 200 proceeds to block 212, at which the deployment manager 142 determines whether a successful deployment condition has been met. If the deployment manager 142 determines that the successful deployment condition has not been met, the routine 200 returns to block 204 to launch one or more new tasks using the new user code. Otherwise, the routine 200 proceeds to block 214, at which the deployment manager 142 determines that the new user code was successfully deployed. The routine 200 may then end.

The routine 200 can include fewer, more, or different blocks than those illustrated in FIG. 2 and/or one or more blocks illustrated in FIG. 2 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Automatically Detecting and Terminating a Failed Deployment

Figure 3:
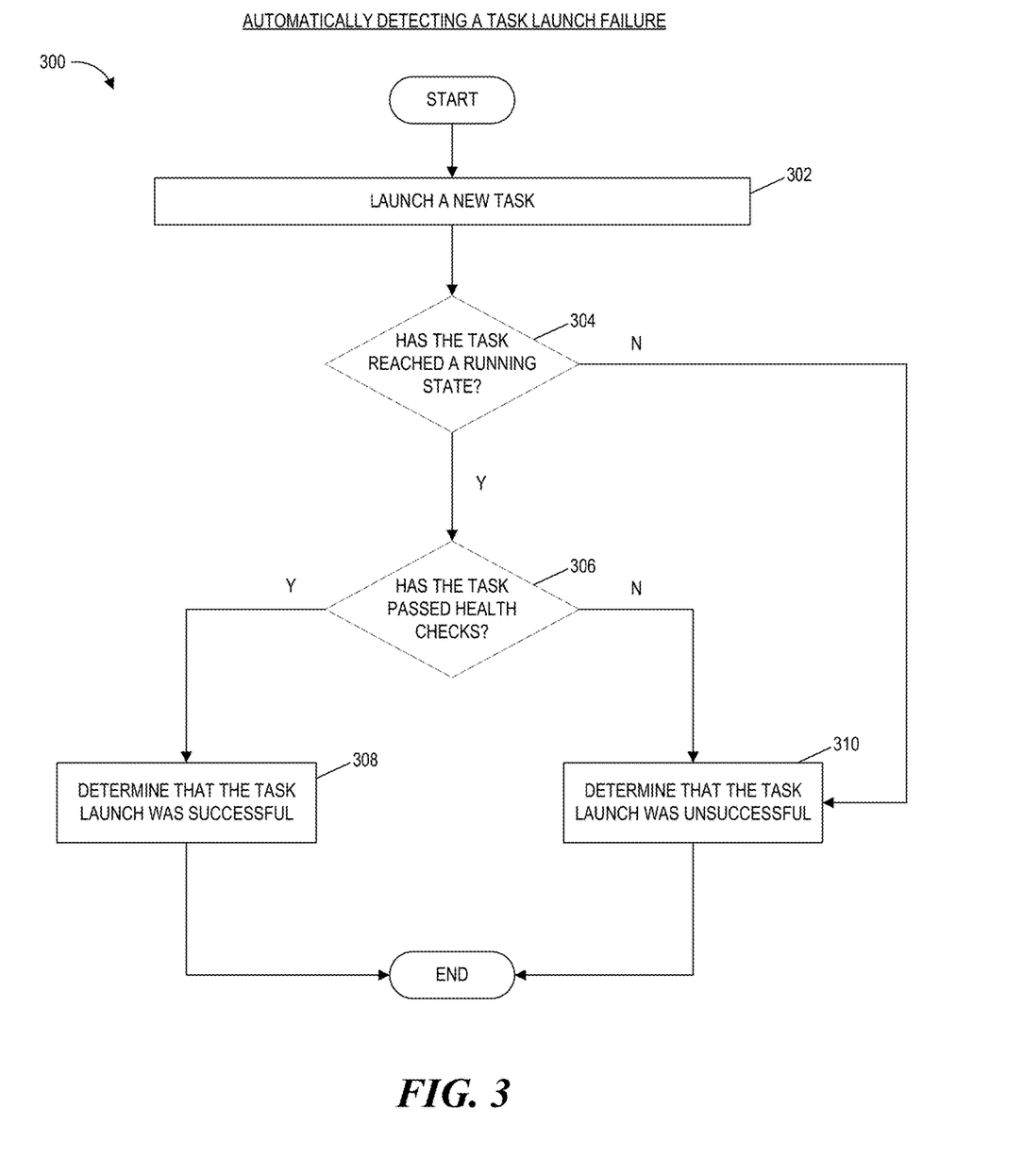
FIG. 3 is a flowchart of an example process for automatically detecting a task launch failure, in accordance with aspects of the present disclosure.

FIG. 3 depicts an illustrative routine 300 for automatically detecting and terminating a failed deployment in accordance with aspects of the present disclosure. The routine 300 may be carried out, for example, by the container service 140 (or a component thereof such as the deployment manager 142) or one or more other components of the cloud provider network 120 described herein. For convenience, some or all of the steps of the routine 300 are described as being performed by the deployment manager 142. For example, the deployment manager 142 may include one or more hardware computing devices and non-transitory physical computer storage storing instructions that, when executed by the one or more hardware computing devices, cause the one or more hardware computing devices to perform the steps of the routine 300.

The routine 300 begins at block 302, at which the deployment manager 142 launches a new task. For example, the deployment of a new user code described herein may be associated with a specific number of healthy tasks to be executed in parallel, and the deployment manager 142 may repeat the routine 300 until the specific number is reached (or until the deployment is declared as failed).

At block 304, the deployment manager 142 determines whether the task has reached a running state. For example, a task may at least be associated with one of a waiting state, a ready state, and a running state. A waiting state may indicate that the task is not yet ready to be executed (e.g., a condition for executing the task may not yet be met, or an amount of resources necessary to execute the task may not yet be available). A ready state may indicate that the task has completed the preparations necessary for being executed, but is not yet being executed yet (e.g., waiting its turn to be executed). A running state may indicate that the task is currently being executed. If the deployment manager 142 determines that the task has reached a running state, the routine 300 proceeds to block 306. If not, the routine 300 proceeds to block 310, where the task launch is determined to be unsuccessful.

At block 306, the deployment manager 142 determines whether the task has passed health checks. If so, the routine proceeds to block 308, where the task launch is determined to be successful. If not, the routine proceeds to block 310, where the task launch is determined to be unsuccessful. For example, the deployment manager 142 may determine that the task has failed a health check based on the task not satisfying a condition specified by the health check (e.g., response time is less than 5 seconds). In some embodiments, the deployment manager 142 may determine that the task has failed the health check only if the deployment manager 142 determines that the task does not satisfy the condition specified by the health check a threshold number of times in a row (e.g., five times in a row).

The routine 300 can include fewer, more, or different blocks than those illustrated in FIG. 3 and/or one or more blocks illustrated in FIG. 3 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Automatically Detecting and Terminating a Failed Deployment

Figure 4:
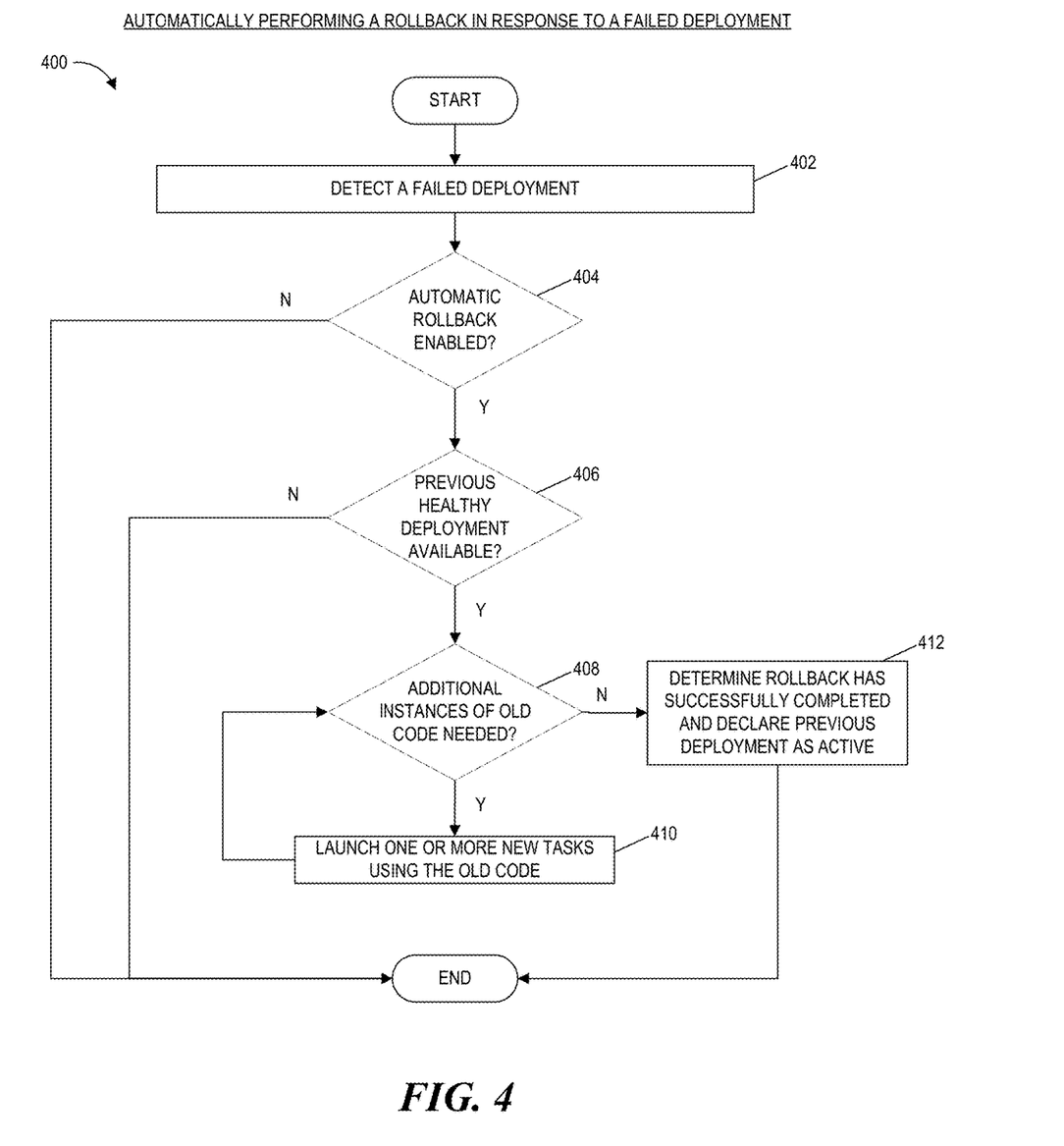
FIG. 4 is a flowchart of an example process for automatically performing a rollback in response to a failed deployment, in accordance with aspects of the present disclosure.

FIG. 4 depicts an illustrative routine 400 for automatically detecting and terminating a failed deployment in accordance with aspects of the present disclosure. The routine 400 may be carried out, for example, by the container service 140 (or a component thereof such as the deployment manager 142) or one or more other components of the cloud provider network 120 described herein. For convenience, some or all of the steps of the routine 400 are described as being performed by the deployment manager 142. For example, the deployment manager 142 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the deployment manager 142 detects a failed deployment. For example, a failed deployment may be detected using the techniques described herein with reference to FIGS. 1-3.

At block 404, the deployment manager 142 determines whether automatic rollback is enabled. If enabled, the routine proceeds to block 406. In some embodiments, the deployment manager 142 maintains a flag that indicates whether or not automatic rollback is enabled. Additionally, or alternatively, the deployment manager 142 may maintain an indication of a deployment that should be activated in the event that the deployment of the new user code fails (e.g., as detected at block 402). For example, a default value of such an indication may indicate that a successful deployment existing at the time of initiating the deployment of the new user code (or one that immediately precedes the new deployment) should be reinstated or re-deployed. As another example, the user may specify the identity of the deployment that should be activated upon the failure of the new user code deployment.

At block 406, the deployment manager 142 determines whether a previous healthy deployment is available. If available, the routine 400 proceeds to block 408. In some embodiments, the deployment manager 142 may instead determine whether a deployment to be rolled back to (or rolled forward to) has been specified by the user (or exists as a default option). In such embodiments, the deployment manager 142 may use the specified deployment.

At block 408, the deployment manager 142 determines whether additional instances of the old user code need to be launched. For example, while launching one or more new tasks using the new user code as part of the deployment that was determined to be failed at block 402, the deployment manager 142 may have terminated one or more old tasks that were running based on the old user code, since the work done by the old tasks can now be done by the new tasks. Once the new deployment is declared as failed, one or more additional tasks based on the old user code may need to be launched to satisfy the number of required tasks associated with the deployment.

If the deployment manager 142 determines that one or more additional instances of the old user code need to be launched, the routine 400 proceeds to block 410 to launch new tasks using the old code as needed, and repeats blocks 408 and 410 until no additional instances are needed. If the deployment manager 142 determines that no additional instances need to be launched, the routine 400 proceeds to block 412, where the deployment manager 142 determines rollback has successfully completed and declares the previous deployment as active.

The routine 400 can include fewer, more, or different blocks than those illustrated in FIG. 4 and/or one or more blocks illustrated in FIG. 4 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Automatically Detecting and Terminating a Failed Deployment

Figure 5:
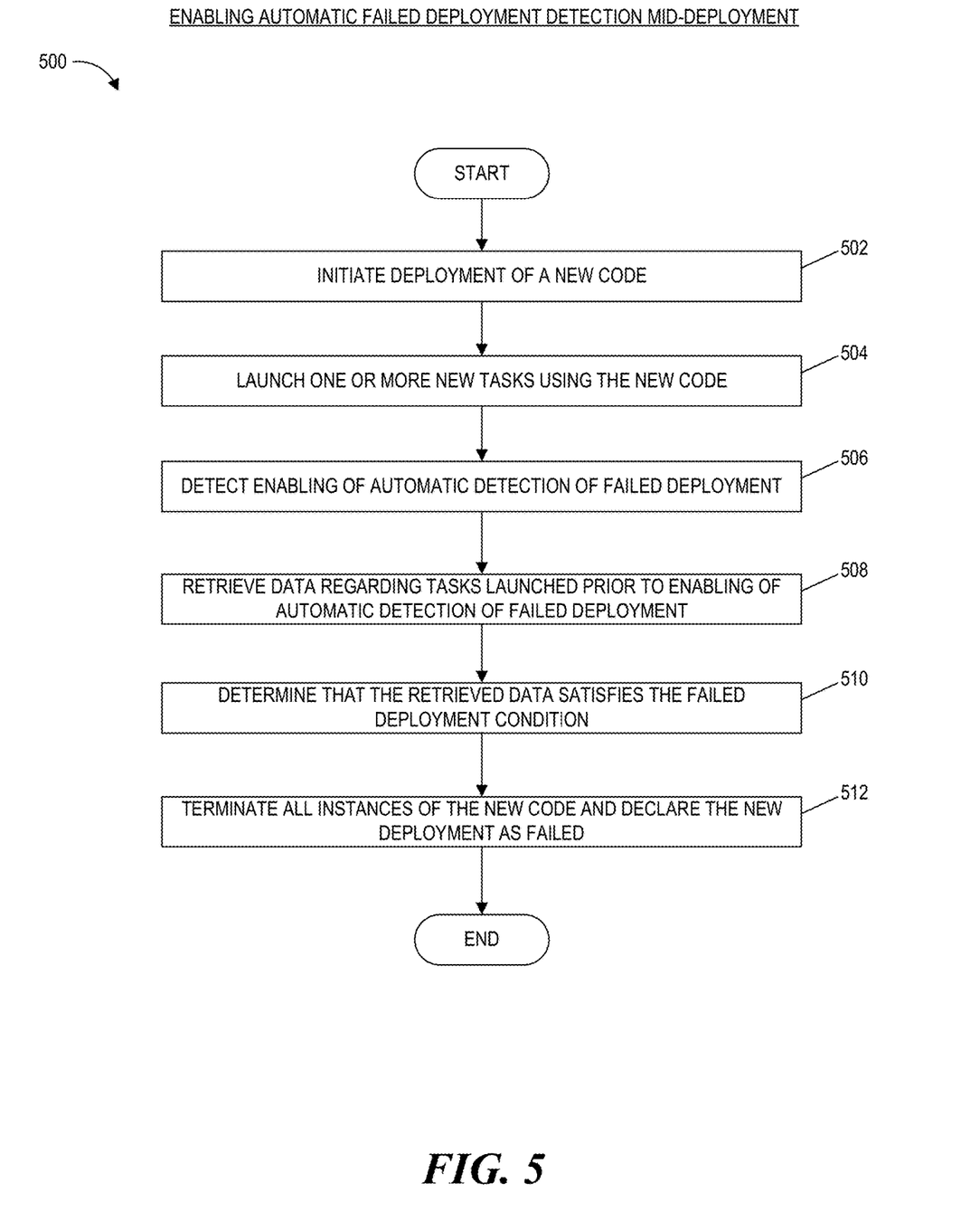
FIG. 5 is a flowchart of an example process for enabling automatic failed deployment detection mid-deployment, in accordance with aspects of the present disclosure.

FIG. 5 depicts an illustrative routine 500 for automatically detecting and terminating a failed deployment in accordance with aspects of the present disclosure. The routine 500 may be carried out, for example, by the container service 140 (or a component thereof such as the deployment manager 142) or one or more other components of the cloud provider network 120 described herein. For convenience, some or all of the steps of the routine 500 are described as being performed by the deployment manager 142. For example, the deployment manager 142 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the deployment manager 142 initiates a deployment of a new user code. At the time of initiating the deployment of the new user code, automatic failed deployment detection may not be enabled. If automatic failed deployment detection is not enabled, the deployment manager 142 may not automatically detect the failure of and/or terminate a deployment, and allow the deployment of the new user code to be retried until the user intervenes and manually terminates the deployment or until a predetermined timeout period (e.g., 3 hours) has been reached.

At block 504, the deployment manager 142 launches one or more new tasks using the new user code. For example, the deployment initiated at block 502 may be associated with a specific number of healthy tasks to be executed in parallel, and the deployment manager 142 may continue to launch additional tasks until the specific number is reached.

At block 506, the deployment manager 142 detects enabling of automatic detection of failed deployment. For example, the deployment manager 142 may receive, from the user associated with the new user code, a request to enable automatic failed deployment detection specifically for the deployment initiated at block 502 or generally for code deployments associated with the user.

At block 508, the deployment manager 142 retrieves data regarding tasks launched prior to enabling of automatic detection of failed deployment. For example, the deployment manager 142 or another component of the cloud provider network 120 may have been keeping track of various metrics associated with the deployment initiated at block 502 that indicate the performance and progress of the deployment such as the number of tasks initiated, the number of tasks successfully launched, the number of tasks that failed to launch, the errors encountered by the task launches, and the like. These metrics may be retrieved in response to detecting that automatic failed deployment detection has been enabled, so that the deployment manager 142 can determine whether or not a deployment has failed based not only on the metrics generated after detecting that automatic failed deployment detection has been enabled but also on the metrics generated before detecting that automatic failed deployment detection has been enabled (or before automatic failed deployment detection is enabled). By doing so, the deployment manager 142 may detect a failed deployment much sooner than if the deployment manager 142 only used the data generated after detecting that automatic failed deployment detection has been enabled.

At block 510, the deployment manager 142 determines that the retrieved data satisfies the failed deployment condition. For example, if the retrieved data satisfies a failed deployment condition, the deployment manager 142 may detect the failed deployment without having to continue to launch another task using the new user code after detecting that automatic failed deployment detection has been enabled. As another example, if the retrieved data does not satisfy a failed deployment condition, the deployment manager 142 may continue to launch additional tasks using the new user code until the failed deployment condition is satisfied. In such an example, the failed deployment condition may be satisfied by a combination of the metrics generated prior to block 506, and the metrics generated subsequent to block 506. In some cases, the deployment manager 142 may determine that the failed deployment condition has been satisfied based only on the metrics generated subsequent to block 506.

At block 512, the deployment manager 142 terminates all instances of the new user code, if any, and declares the new deployment as failed. Alternatively, in some embodiments, the deployment manager 142 may pause any instances of the new user code without terminating them. The deployment manager 142 may also send a notification to the user of the new user code that the deployment and/or the instances of the new user code have been terminated or paused. Routine 500 may then end.

If the deployment manager 142 determines that the failed deployment condition has not been met, the routine 500 proceeds to block 512, at which the deployment manager 142 determines whether a successful deployment condition has been met. If the deployment manager 142 determines that the successful deployment condition has not been met, the routine 500 returns to block 504 to launch one or more new tasks using the new user code. Otherwise, the routine 500 proceeds to block 514, at which the deployment manager 142 determines that the new user code was successfully deployed. The routine 500 may then end.

The routine 500 can include fewer, more, or different blocks than those illustrated in FIG. 5 and/or one or more blocks illustrated in FIG. 5 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Computing System

Figure 6:
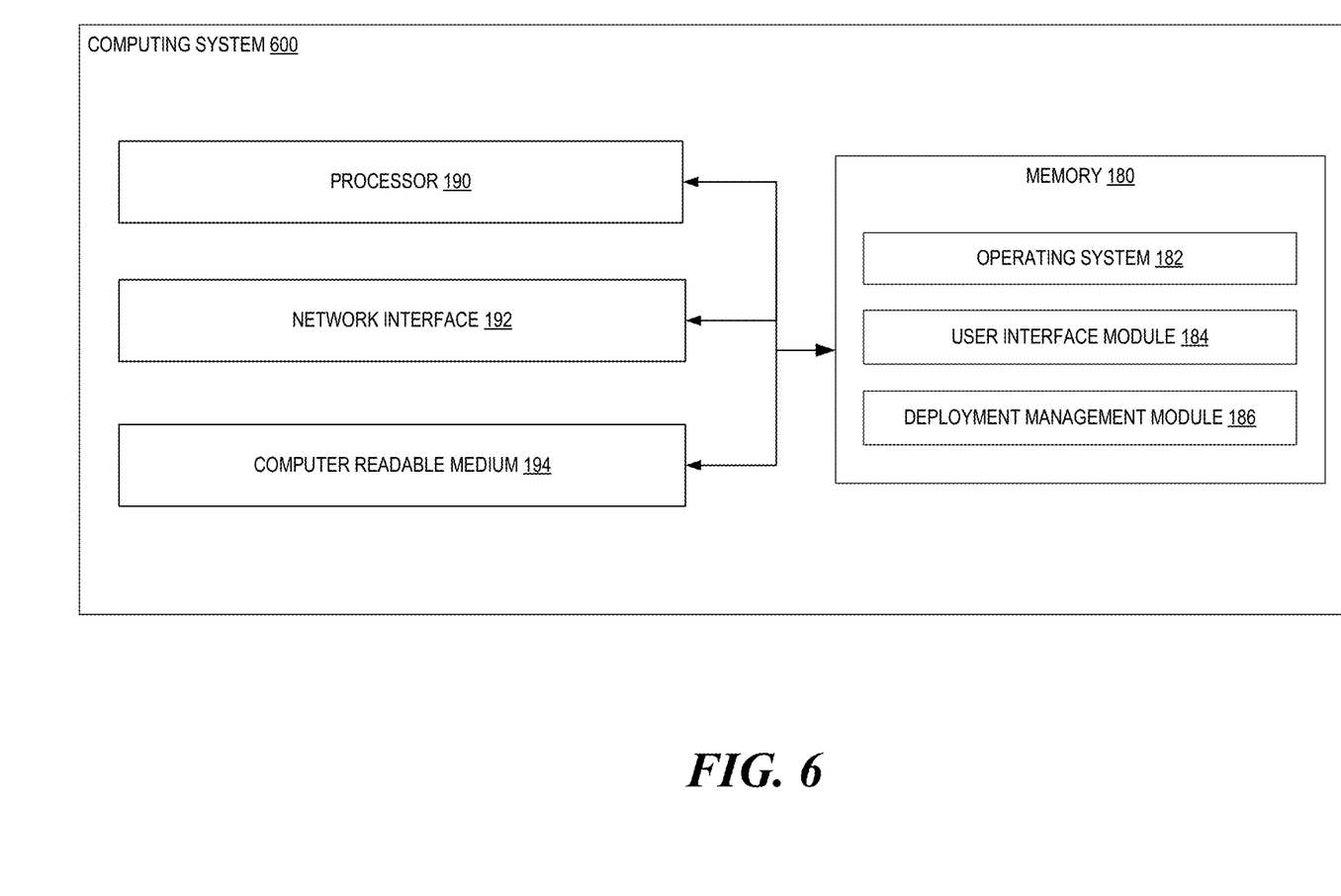
FIG. 6 depicts a general architecture of a computing device or system usable to implement one or more components descried herein, in accordance with aspects of the present disclosure.

FIG. 6 depicts an example architecture of a computing system 600 that can be used to perform one or more of the techniques described herein or illustrated in FIGS. 1-5. The general architecture of the computing system 600 depicted in FIG. 6 includes an arrangement of computer hardware and software modules that may be used to implement one or more aspects of the present disclosure. The computing system 600 may include many more (or fewer) elements than those shown in FIG. 6. It is not necessary, however, that all of these elements be shown in order to provide an enabling disclosure. For example, the computing system 600 may be used to implement one or more of the elements described herein, including the block store servers 105, the object storage servers 110, the encryption servers 115, and/or the user computing devices 102.

As illustrated, the computing system 600 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 600. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include a deployment management module 186 that may be executed by the processor 190. In one embodiment, the deployment management module 186 implements various aspects of the present disclosure, e.g., those illustrated in FIGS. 1-5 or described with reference to FIGS. 1-5.

Although a single processor, a single network interface, a single computer-readable medium, and a single memory are illustrated in the example of FIG. 6, in other implementations, the computing system 600 can have a multiple of one or more of these components (e.g., two or more processors and/or two or more memories).

Enumerated Implementations (EIs)

Some examples of enumerated implementations (EIs) are provided in this section, without limitation.

EI 1: A cloud provider system comprising: a set of physical machines hosting compute capacity comprising a plurality of compute instances usable to execute user code; and a container service comprising computer hardware, wherein the container service is configured to at least: receive, from a user computing device, a request to deploy a new user code onto one or more compute instances on behalf of a user associated with the user computing device, wherein the new user code is an updated version of an old user code associated with the user to be replaced by the new user code; attempt to execute a plurality of instances of the new user code on the one or more compute instances; prior to replacing all instances of the old user code to be replaced by the plurality of instances of the new user code as part of the deployment, determine that at least a threshold number of consecutive attempts to execute the new user code has failed; and cause the deployment of the new user code to be terminated such that no additional attempt to execute the new user code is made.

EI 2: The cloud provider system of EI 1, wherein the container service is further configured to determine that the threshold number of consecutive attempts has failed based on at least the threshold number of consecutive instances failing to reach a running state.

EI 3: The cloud provider system of EI 1, wherein the container service is further configured to determine that the threshold number of consecutive attempts has failed based on at least the threshold number of consecutive instances having reached a running state but failing one or more health checks.

EI 4: The cloud provider system of EI 1, wherein the container service is further configured to, in response to causing the deployment of the new user code to be terminated, initiate a rollback to a previous deployment associated with the user, wherein the previous deployment is associated with an old user code different from the new user code.

EI 5: A computer-implemented method comprising: receiving, from a user computing device, a request to deploy a new user code onto one or more compute instances usable to execute the new user code, wherein the requested deployment of the new user code is a rolling deployment in which at least one instance of an old user code executing at the time of receiving the request is to be terminated prior to executing all of a plurality of instances of the new user code specified by the request; attempting to execute a batch of instances of the new user code on the one or more compute instances, wherein the batch of instances is less that the plurality of instances specified by the request; determining that the deployment of the new user code has satisfied a failed deployment condition; and terminating the deployment of the new user code.

EI 6: The computer-implemented method of EI 5, further comprising determining that the failed deployment condition has been satisfied based on a threshold number of consecutive attempts to execute the new user code having failed.

EI 7: The computer-implemented method of EI 6, further comprising determining that the threshold number of consecutive attempts has failed based on at least the threshold number of consecutive instances failing to reach a running state.

EI 8: The computer-implemented method of EI 6, further comprising determining that the threshold number of consecutive attempts has failed based on at least the threshold number of consecutive instances having reached a running state but failing one or more health checks.

EI 9: The computer-implemented method of EI 5, further comprising initiating, in response to causing the deployment of the new user code to be terminated, a rollback to a previous deployment associated with the user, wherein the previous deployment is associated with an old user code different from the new user code.

EI 10: The computer-implemented method of EI 9, wherein the rollback comprises causing one or more additional instances of the old user code to be executed.

EI 11: The computer-implemented method of EI 10, wherein the number of the one or more additional instances of the old user code caused to be executed as part the rollback equals the number of instances of the old user code terminated during the deployment of the new user code.

EI 12: The computer-implemented method of EI 5, wherein the compute instance is one of a virtual machine instance, a bare metal instance, a physical machine, a container, a node, or an offload card.

EI 13: A non-transitory computer readable medium storing instructions that, when executed by a computing system within a cloud provider network, cause the computing system to perform operations comprising: receiving, from a user computing device, a request to deploy a new user code onto one or more compute instances usable to execute the new user code, wherein the requested deployment of the new user code is a rolling deployment in which at least one instance of an old user code executing at the time of receiving the request is to be terminated prior to executing all of a plurality of instances of the new user code specified by the request; attempting to execute a batch of instances of the new user code on the one or more compute instances, wherein the batch of instances is less that the plurality of instances specified by the request; determining that the deployment of the new user code has satisfied a failed deployment condition; and terminating the deployment of the new user code.

EI 14: The non-transitory computer readable medium of EI 13, storing further instructions that, when executed by the computing system, cause the computing system to perform operations comprising determining that the failed deployment condition has been satisfied based on a threshold number of consecutive attempts to execute the new user code having failed.

EI 15: The non-transitory computer readable medium of EI 14, storing further instructions that, when executed by the computing system, cause the computing system to perform operations comprising determining that the threshold number of consecutive attempts has failed based on at least the threshold number of consecutive instances failing to reach a running state.

EI 16: The non-transitory computer readable medium of EI 14, storing further instructions that, when executed by the computing system, cause the computing system to perform operations comprising determining that the threshold number of consecutive attempts has failed based on at least the threshold number of consecutive instances having reached a running state but failing one or more health checks.

EI 17: The non-transitory computer readable medium of EI 13, storing further instructions that, when executed by the computing system, cause the computing system to perform operations comprising initiating, in response to causing the deployment of the new user code to be terminated, a rollback to a previous deployment associated with the user, wherein the previous deployment is associated with an old user code different from the new user code.

EI 18: The non-transitory computer readable medium of EI 17, wherein the rollback comprises causing one or more additional instances of the old user code to be executed.

EI 19: The non-transitory computer readable medium of EI 18, wherein the number of the one or more additional instances of the old user code caused to be executed as part the rollback equals the number of instances of the old user code terminated during the deployment of the new user code.

EI 20: The non-transitory computer readable medium of EI 13, wherein the compute instance is one of a virtual machine instance, a bare metal instance, a physical machine, a container, a node, or an offload card.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "set" is used to include "one or more." For example, a set of objects may include a single object or multiple objects.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
   a set of physical machines hosting compute capacity comprising a plurality of compute instances usable to execute user code; and
   a container service comprising computer hardware, wherein the container service is configured to at least:
     receive, from a user computing device, a request to deploy a new user code onto one or more compute instances on behalf of a user associated with the user computing device, wherein the new user code is an updated version of an old user code associated with the user to be replaced by the new user code;
     attempt to execute a plurality of instances of the new user code on the one or more compute instances;
     determine a first number of instances failing to reach a running state due to a first type of failure, wherein the first type of failure comprises an insufficient amount of compute capacity being available;
     determine a second number of instances failing to reach a running state due to a second type of failure, wherein the second type of failure comprises a number of consecutive launch retries being performed;
     determine a total number of instances failing to reach a running state, wherein the total number includes both the first number and the second number;
     prior to replacing all instances of the old user code to be replaced by the plurality of instances of the new user code as part of the deployment, determine that the deployment of the new user code has satisfied a failed deployment condition for terminating the deployment of the new user code based at least in part on the total number of instances failing to reach a running state being greater than or equal to a threshold number; and
     cause the deployment of the new user code to be terminated such that no additional attempt to execute the new user code is made.

2. The cloud provider system of claim 1, wherein the container service is further configured to determine that the deployment of the new user code has satisfied the failed deployment condition based on at least the threshold number of consecutive instances failing to reach a running state.

3. The cloud provider system of claim 1, wherein the container service is further configured to determine that the deployment of the new user code has satisfied the failed deployment condition based on at least the threshold number of consecutive instances having reached a running state but failing one or more health checks.

4. The cloud provider system of claim 1, wherein the container service is further configured to, in response to causing the deployment of the new user code to be terminated, initiate a rollback to a previous deployment associated with the user, wherein the previous deployment is associated with an old user code different from the new user code.

5. A computer-implemented method comprising:
   receiving, from a user computing device, a request to deploy a new user code onto one or more compute instances usable to execute the new user code, wherein the requested deployment of the new user code is a rolling deployment in which at least one instance of an old user code executing at the time of receiving the request is to be terminated prior to executing all of a plurality of instances of the new user code specified by the request;

attempting to execute a batch of instances of the new user code on the one or more compute instances, wherein the batch of instances is less than the plurality of instances specified by the request;

determining a first number of instances from the batch of instances failing to reach a running state due to a first type of failure, wherein the first type of failure comprises an insufficient amount of compute capacity being available;

determining a second number of instances from the batch of instances failing to reach a running state due to a second type of failure, wherein the second type of failure comprises a number of consecutive launch retries being performed;

determining a total number of instances from the batch of instances failing to reach a running state, wherein the total number includes both the first number and the second number;

determining that the deployment of the new user code has satisfied a failed deployment condition for terminating the deployment of the new user code based at least in part on the total number of instances failing to reach a running state being greater than or equal to a threshold number; and terminating the deployment of the new user code.

6. The computer-implemented method of claim 5, further comprising determining that the failed deployment condition has been satisfied based on the threshold number of consecutive attempts to execute the new user code having failed.

7. The computer-implemented method of claim 5, further comprising determining that the based on at least the threshold number of consecutive instances failing to reach a running state.

8. The computer-implemented method of claim 5, further comprising determining that the failed deployment condition has been satisfied based at least in part on a number of consecutive instances having reached a running state but failing one or more health checks.

9. The computer-implemented method of claim 5, further comprising initiating, in response to causing the deployment of the new user code to be terminated, a rollback to a previous deployment associated with the user, wherein the previous deployment is associated with an old user code different from the new user code.

10. The computer-implemented method of claim 9, wherein the rollback comprises causing one or more additional instances of the old user code to be executed.

11. The computer-implemented method of claim 10, wherein the number of the one or more additional instances of the old user code caused to be executed as part the rollback equals the number of instances of the old user code terminated during the deployment of the new user code.

12. The computer-implemented method of claim 5, wherein the compute instance is one of a virtual machine instance, a bare-metal instance, a physical machine, a container, a node, or an offload card.

13. A non-transitory computer-readable medium storing instructions that, when executed by a computing system within a cloud provider network, cause the computing system to perform operations comprising:

receiving, from a user computing device, a request to deploy a new user code onto one or more compute instances usable to execute the new user code, wherein the requested deployment of the new user code is a rolling deployment in which at least one instance of an old user code executing at the time of receiving the request is to be terminated prior to executing all of a plurality of instances of the new user code specified by the request;

attempting to execute a batch of instances of the new user code on the one or more compute instances, wherein the batch of instances is less than the plurality of instances specified by the request;

determining a first number of instances from the batch of instances failing to reach a running state due to a first type of failure, wherein the first type of failure comprises an insufficient amount of compute capacity being available;

determining a second number of instances from the batch of instances failing reach a running state due to a second type of failure, wherein the second type of failure comprises a number of consecutive launch retries being performed;

determining a total number of instances, from the batch of instances failing to reach a running state, wherein the total number includes both the first number and the second number;

determining that the deployment of the new user code has satisfied a failed deployment condition for terminating the deployment of the new user code based at least in part on the total number of instances failing to reach a running state being greater than or equal to a threshold number; and terminating the deployment of the new user code.

14. The non-transitory computer-readable medium of claim 13, storing further instructions that, when executed by the computing system, cause the computing system to perform operations comprising determining that the failed deployment condition has been satisfied based on the threshold number of consecutive attempts to execute the new user code having failed.

15. The non-transitory computer-readable medium of claim 13, storing further instructions that, when executed by the computing system, cause the computing system to perform operations comprising determining that the failed deployment condition has been satisfied based on at least the threshold number of consecutive instances failing to reach a running state.

16. The non-transitory computer-readable medium of claim 13, storing further instructions that, when executed by the computing system, cause the computing system to perform operations comprising determining that the failed deployment condition has been satisfied based at least in part on a number of consecutive instances having reached a running state but failing one or more health checks.

17. The non-transitory computer-readable medium of claim 13, storing further instructions that, when executed by the computing system, cause the computing system to perform operations comprising initiating, in response to causing the deployment of the new user code to be terminated, a rollback to a previous deployment associated with the user, wherein the previous deployment is associated with an old user code different from the new user code.

18. The non-transitory computer-readable medium of claim 17, wherein the rollback comprises causing one or more additional instances of the old user code to be executed.

19. The non-transitory computer-readable medium of claim 18, wherein the number of the one or more additional instances of the old user code caused to be executed as part of the rollback equals the number of instances of the old user code terminated during the deployment of the new user code.

20. The non-transitory computer-readable medium of claim 13, wherein the compute instance is one of a virtual machine instance, a bare-metal instance, a physical machine, a container, a node, or an offload card.

\* \* \* \* \*

UNITED STATES PATENT AND TRADEMARK OFFICE
CERTIFICATE OF CORRECTION

| | |
|---|---|
| PATENT NO. | : 11,797,287 B1 |
| APPLICATION NO. | : 17/204626 |
| DATED | : October 24, 2023 |
| INVENTOR(S) | : Mohan Ghai et al. |

It is certified that error appears in the above-identified patent and that said Letters Patent is hereby corrected as shown below:

In the Claims

Column 22, Line 20, Claim 13, after "failing" insert -- to --.

Column 22, Line 24, Claim 13, delete "instances," and insert -- instances --.

Signed and Sealed this
Sixteenth Day of April, 2024

Katherine Kelly Vidal
*Director of the United States Patent and Trademark Office*